Dec. 3, 1940.  A. BERNIER  2,223,477
SCREEN FOR VEHICLE WINDOWS
Filed May 10, 1940  2 Sheets-Sheet 1
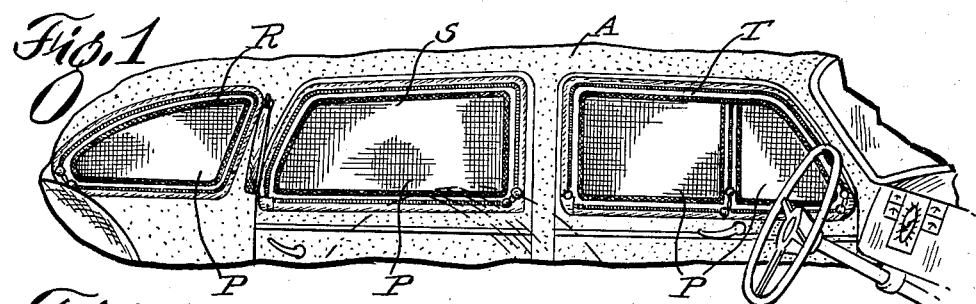
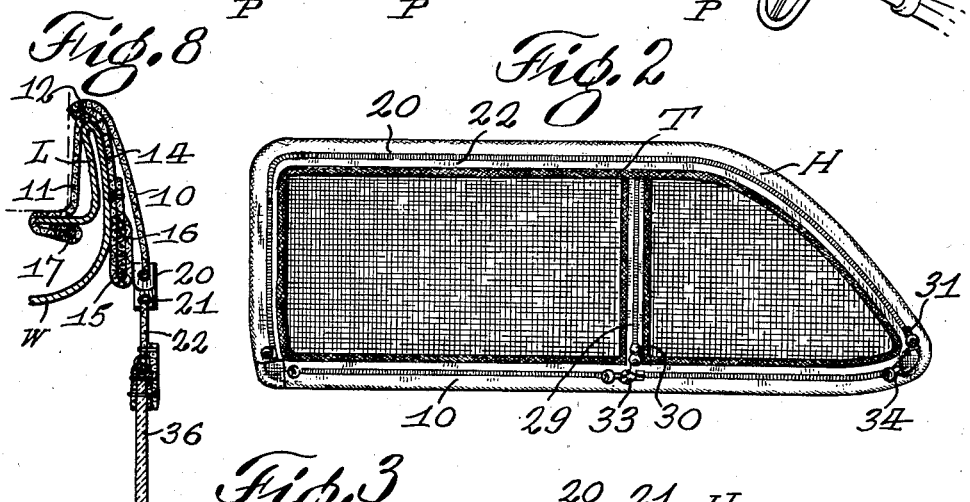
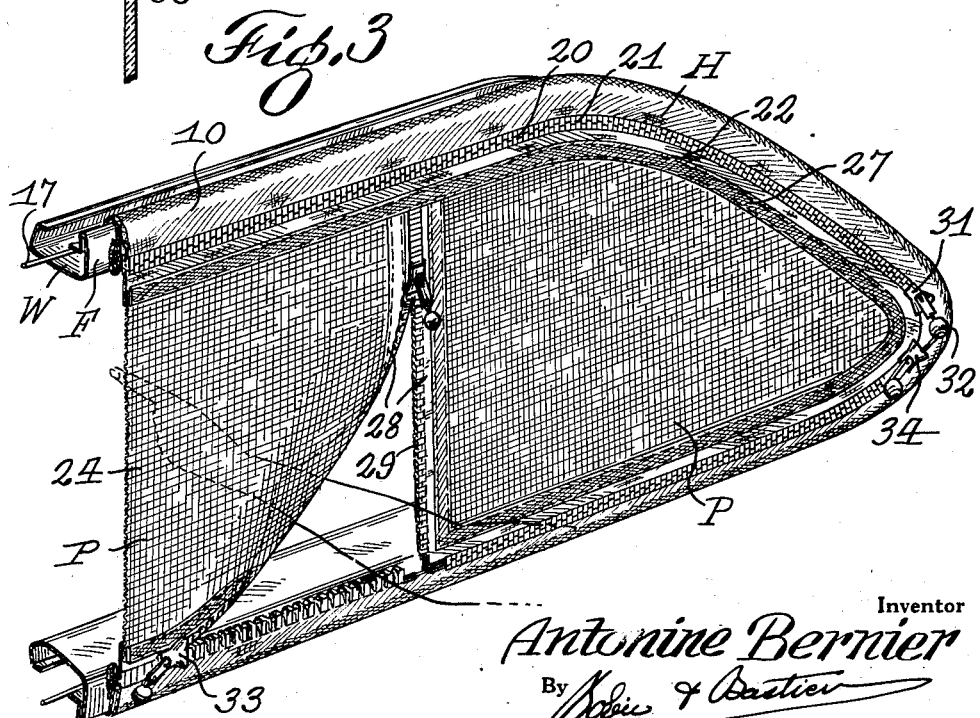
Inventor
Antonine Bernier
By
Attorneys

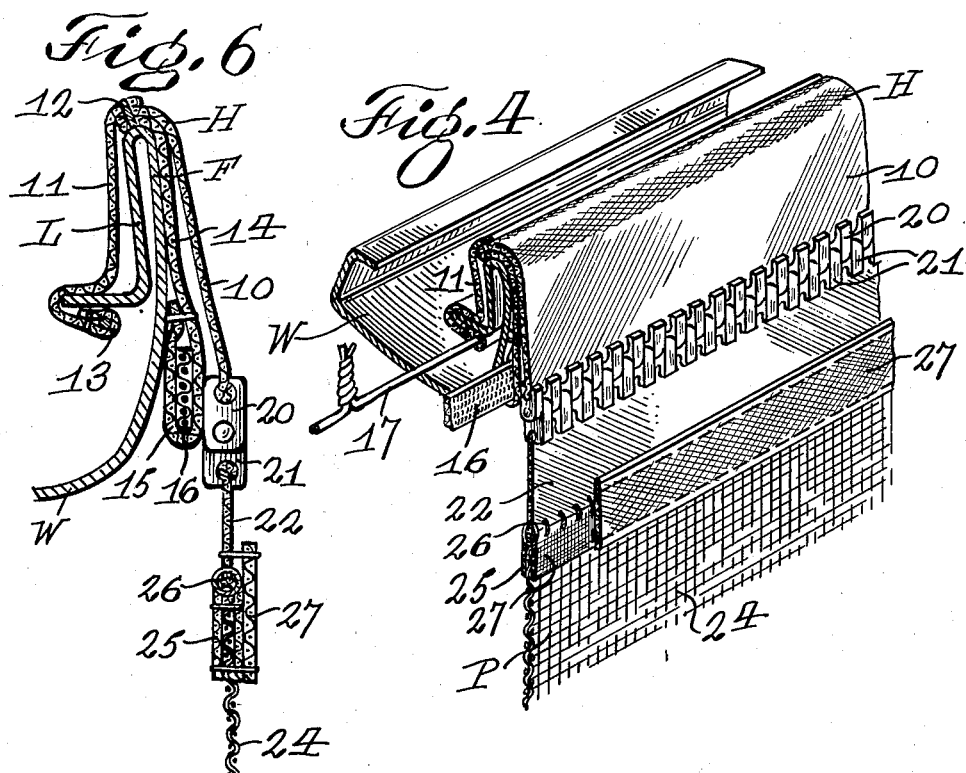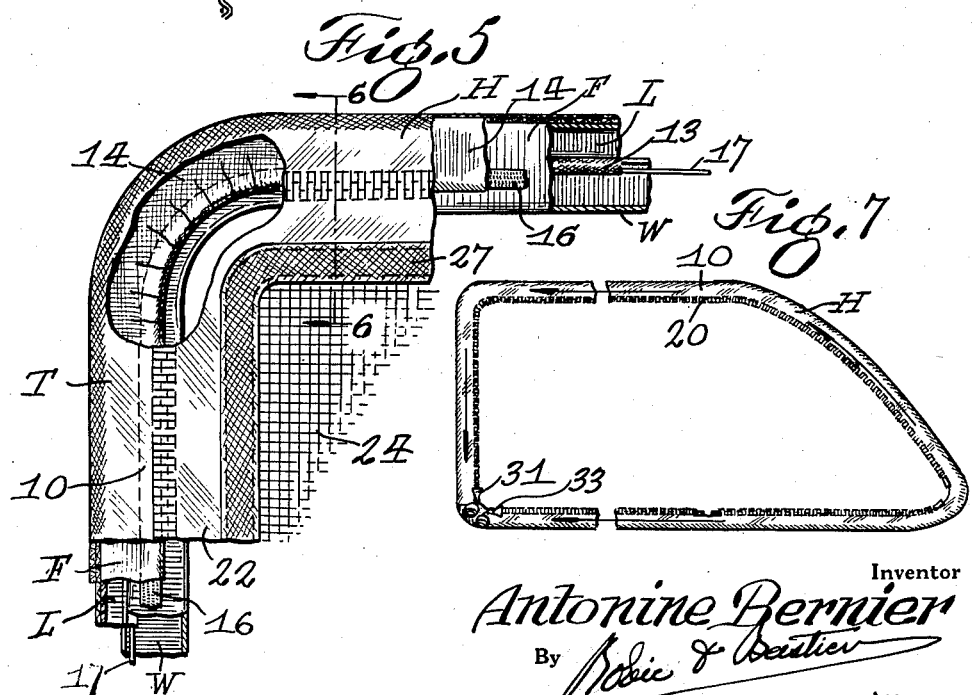

Patented Dec. 3, 1940

2,223,477

UNITED STATES PATENT OFFICE 2,223,477

SCREEN FOR VEHICLE WINDOWS

Antonine Bernier, Montreal, Quebec, Canada

Application May 10, 1940, Serial No. 334,413

8 Claims. (Cl. 156—14)

The present invention relates to improvements in screens for vehicle windows and more particularly for the windows of closed-body automobiles.

An object of the invention is the provision of a screen or covering which may be readily applied to the windows of conventional automobiles and similar vehicles.

Another object of the invention is the provision of a window covering of the aforesaid character, which is highly efficient for preventing the entrance of insects.

A further object of the invention is the provision of window screen construction designed so that panels thereof may be conveniently removed and interchanged.

Still another object of the invention is the provision of a vehicle window screen constructed so that a portion may be opened to extend the hand for signalling purposes.

A still further object of the invention is the provision of a vehicle window screen having a marginal holding part or frame which is firmly attached to the frame of the window.

Other objects and advantages of the invention will become apparent as the description progresses.

In the accompanying drawings forming a part of this specification and in which like reference characters are employed to designate corresponding parts throughout the same:

Figure 1 is a longitudinal section through an automobile showing the screen construction applied to the windows thereof, Figure 2 is an interior side elevational view of the screen structure applied to a window frame, Figure 3 is an enlarged fragmentary perspective view of the same showing part of one of the screen panels in open arrangement, Figure 4 is an enlarged fragmentary perspective view showing the structure for attaching the screen to the window frame, Figure 5 is an enlarged fragmentary interior elevation of the screen attached to a window frame partly broken away to illustrate interior construction, Figure 6 is an enlarged transverse section taken on the line 6—6 of Figure 5, Figure 7 is an interior elevational view of the marginal screen frame attached to a window frame, and Figure 8 is a transverse sectional view showing a modified form of the invention.

Referring to Figures 1 to 7 inclusive, wherein is illustrated a preferred embodiment of the invention, A generally designates a conventional automobile having a body of the sedan type provided with a plurality of windows equipped with window frames W. The frame W, which is of conventional construction, embodies, in the example shown, an essentially channel-shaped continuous metallic frame having a relatively wide inner side flange F and formed with an extension part which is bent to assume a position inwardly of the flange F and which is substantially of L-shaped cross section to provide a lining lip indicated at L.

My invention resides in initially attaching to the inner flanged portion of the window frame W a continuous flexible holding member or screen frame generally indicated at H embodying a strip or stringer 10 which may be formed of fabric, cut on a bias, that is on a bias to the threads thereof. To the outer edge portion of the stringer 10 is secured an extension strip 11, attached to the stringer by stitching 12. At the opposite margin the extension strip 11 is formed to provide a tubular marginal hem 13. The stitching seam 12 also connects the outer marginal portion of a lining strip 14 to the connection between the stringer 10 and the extension strip 11, this liner being disposed to extend substantially parallel with the stringer and having the inner marginal portion folded to form a tubular hem 15 which incloses an elastic strip 16. This continuous strip assembly forming the holder or screen frame H is formed to fit snugly over the outer edge portion of the inner window frame flange F so that the stringer 10 and liner strip 14 extend over the inner face of the flange and over the outer edge while the extension strip 11 is fitted over the lining lip L and tightly fastened under the same by a longitudinal wire 17 extended through the hem 13 of the extension strip.

To the inner free edge of the stringer 10 are secured a plurality of fastener elements 20, of preferred known construction, operable to assume interlocking engagement with complementary fastening elements 21 secured to the outer edge portion of a continuous stringer 22 adapted to assume complementary relation with the stringer 10.

To the inner edge of the stringer 22 are connected one or more covering panels P, in the present example embodying sections of wire screening or netting 24. About the margin of each panel P is secured, by stitching or the like, a folded or doubled edge strip 25 of cloth or the like, as shown to advantage at Figures 4 and 6, while the outer folded edge of the strip is secured to the adjacent edge of the stringer 22 by stitching 26. In order to conceal the stitching connection and enhance the appearance of the panel a covering tape is applied to cover the inner side of the edge strip 25 and the connection stitching. As shown at Figure 1 the covering for the two rear windows at each side of the car, indicated at R and S respectively, may advantageously embody a single covering panel, while the covering P for each of the front windows preferably embodies two transversely divided sections for a purpose which will be hereinafter described. For this purpose, the adjacent normally vertical edges of the respective front and rear sections of the front window are fitted with stringer strips 28 having interlocking elements 29 attached to their adjacent edges and upon which is movable a slider 30 for locking or unlocking the said elements. This fastener connection is arranged to extend from the inner edge of the bottom extension of the stringer 22 to the upper extension of the panel edge strip 25, as shown at Figures 2 and 3. The top and end edges of the assembled panel covering are detachably united to the covering frame H by a single fastener connection embodying the fastener elements 20 and 21 and a slider 31 conveniently operable by a knob 32 flexibly attached to the slider pull tongue. The bottom edges of the double panel covering are attached to the covering frame by a rear slider connection locked by a slider 33, while the forward panel is connected to the bottom reach of the covering frame by a fastener connection locked by a slider 34. This arrangement enables, through the operation of the sliders 30 and 33, partial disconnection of the lower forward portion of the rear panel of either front window covering so as to provide an opening through which the arm of the vehicle operator may be extended for signalling purposes.

In the modified form of the structure, shown at Figure 8, the covering is varied by substituting for the wire net panel 14 a solid transparent panel 36 which may be formed of Celluloid, glass or the like.

In applying the screen or covering device to the window frame of a vehicle, the flexible marginal frame H is initially mounted in position by fitting the frame strips to embrace the outer marginal part of the channel flange wherein the frame assumes a folded arrangement. The linear fastening elements, that is the wire 17 and the elastic strip or cord 16, are tightly fastened at their ends so as to secure the frame stripping tightly about the rigid window frame. The covering panels are thereafter positioned in the frame and detachably united with the latter by operation of the sliders which function to interlock the slide fastener elements.

During warm weather the panels of wire netting are mounted on the windows and provide effective screens whereby the car windows may be opened and the entrance of insects and the like, which often cause discomfort and danger to the operator, is prevented. When the weather is cold the solid panels may be mounted to displace the screens so as to provide an air space between the conventional car windows and the covering which acts not only to form an insulated wall for maintaining the interior of the car in a more suitably heated condition, but also avoids condensation and consequent frosting of windows. Furthermore, the solid panel structure may be effectively employed as a background for advertising matter which is conveniently removable when desired.

It is to be understood that the forms of my invention herein shown and described are to be taken as preferred examples of the same, and that various changes as to the shape, size and arrangement of parts may be resorted to without departing from the spirit of the invention or the scope of the subjoined claims.

Having thus described my invention, I claim:

1. A window covering comprising a marginal member adapted to be removably fitted on a window frame, and a covering panel detachably connected with the said marginal member.

2. In a covering for vehicle windows, a marginal covering frame adapted to be fitted on the window frame, means for tightly fitting the said marginal frame in position, and a covering panel detachably connected in edge to edge relation with the said marginal frame.

3. In a covering for vehicle windows, a marginal covering frame adapted to be fitted on the window frame, means for tightly fitting the said marginal frame in position, a covering panel, and slide fastener means for connecting the said panel in edge to edge relation with the said marginal frame.

4. In a covering for vehicle windows, a marginal covering frame adapted to be fitted on a window frame, longitudinal elements mounted in the said marginal frame for tightly fastening the same on the window frame, and means for connecting a covering panel with the said marginal frame.

5. In a covering for vehicle windows, a marginal covering frame adapted to be fitted on a window frame, longitudinal elements mounted in the said marginal frame for tightly fastening the same on the window frame, a covering panel, and means for detachably connecting the said panel in edge to edge relation with the said marginal frame.

6. In a covering for vehicle windows, a flexible marginal frame adapted to be fitted in folded-over position on a window frame, tubular hems formed in opposed edge portions of the marginal frame, linear elements extending through the said hems for tightly tying the marginal frame on the window frame, and means for fastening a covering panel to the said marginal frame.

7. In a covering for vehicle windows, a flexible marginal frame adapted to be fitted in folded-over position on a window frame, tubular hems formed in opposed edge portions of the marginal frame, linear elements extending through the said hems for tightly tying the marginal frame on the window frame, a screen panel, and fastener means for detachably connecting the panel in edge to edge relation with the said marginal frame.

8. In a screen for vehicle windows, a marginal covering frame adapted to be fitted in folded arrangement on a window frame, a hem formed at each margin of the covering frame, linear fastening elements extended through the said hems, a stringer attached to the said marginal frame, and means for detachably connecting a screen through the inner edge portion of the stringer.

ANTONINE BERNIER.